United States Patent Office 3,507,331
Patented Apr. 21, 1970

3,507,331
STABILITY OF A SECONDARY-TYPE
RECOVERY PROCESS
Stanley C. Jones, Littleton, Colo., assignor to Marathon Oil Company, Findlay, Ohio, a corporation of Ohio
No Drawing. Filed Dec. 26, 1967, Ser. No. 693,129
Int. Cl. E21b 43/16
U.S. Cl. 166—273
10 Claims

ABSTRACT OF THE DISCLOSURE

A secondary-type crude oil recovery process using a drive fluid to move a displacing fluid containing electrolyte and/or semi-polar organic compound through a subterranean formation to displace crude oil therefrom is improved by incorporating within the front portion of the drive fluid electrolyte and/or semi-polar organic compound. Preferably, the displacing fluid is a micellar dispersion containing surfactant, water, hydrocarbon, electrolyte, and/or semi-polar organic compound (e.g. alcohol) and the front portion of the drive fluid is a mobility buffer containing aqueous medium, a mobility imparting agent, electrolyte and/or semipolar organic compound (e.g. an alcohol similar to the alcohol within the micellar dispersion).

BACKGROUND OF THE INVENTION

Secondary-type recovery of crude oil from subterranean can be ecected by utilizing a displacing fluid and a drive fluid to move the displacing fluid through the formation. In such a process, a relatively viscous zone can form at the juncture of the back portion of the displacing fluid and the front portion of the drive fluid. "Fingering" can result from this condition. Also, where the displacing fluid contains water-soluble components and the front portion of the drive fluid is aqueous, the drive fluid can "leach" or sorb these components. Thus, the displacing fluid loses characteristics imparted by such components and the efficiency of the recovery process is adversely affected.

Applicant has discovered that by incorporating into the front portion of the drive fluid semi-polar organic compound and/or an electrolyte, the overall efficiency of the recovery process can be improved.

DESCRIPTION OF INVENTION

The displacing fluid useful with this invention can be any fluid which effectively displaces or recovers crude oil from the formation. Examples of such fluids include miscible-type slugs containing alcohols, water- or oil-external emulsions and water- or oil-external micellar dispersions. The displacing fluid contains electrolyte and/or semi-polar organic compound.

Preferably, the displacing fluid is a micellar dispersion. The term "micellar dispersion" as used herein is meant to include "micro-emulsions" [Schulman and Montagne, Annals of the New York Academy of Sciences, 92, pp. 360–371 (1961)], olepathic hydro-micelles [Hoar and Schulman, Nature, 152, p. 102 (1943)], "transparent" emulsions (Blair et al., U.S. Patent No. 2,356,205) and micellar solutions, examples include those defined in U.S. Patent's Nos. 3,254,714; 3,275,075; 3,3301,325; 3,307,628; and 3,330,344. Examples of micellar dispersions include those taught in U.S. Patent No. 3,348,611 to Reisberg.

The micellar dispersions of this invention are preferably composed of hydrocarbon, an aqueous medium, and surfactant. Examples of hydrocarbon include crude oil, partially refined fractions thereof, e.g. side cuts from crude columns, crude column overheads, straight-run gasoline, and liquefied petroleum gases. Useful surfactants include cationic, nonionic and anionic surface active compounds. A particularly useful surfactant is an alkyl aryl sulfonate containing an alkali cation (e.g. sodium and ammonium), more commonly known as petroleum sulfonates or as alkyl aryl naphthenic sulfonates. Examples of other useful surfactants are found in U.S. Patent No. 3,254,714. The aqueous medium can be water, brackish water and brine water.

Semi-polar organic compounds (also identified as co-surfactants or co-solubilizers) useful in the displacing fluids, especially the micellar dispersions, include ketones, esters, amides, and alcohols containing from one up to about 20 or more carbon atoms. Preferably, the semi-polar compound is an alcohol, e.g. methanol, isopropanol, n- and isobutanol, the amyl alcohols, 1- and 2-hexanol, 1- and 2-octanol, the decyl alcohols, alkaryl alcohols such as p-nonyl phenol, and alcoholic liquors such as fusel oil. Mixtures of two or more semi-polar organic compounds are useful.

Electrolytes useful with the displacing fluids, especially the micellar dispersions, include inorganic bases, inorganic acids, inorganic salts, organic bases, organic acids, and organic salts. Examples of useful electrolytes include those found in U.S. Patents Nos. 3,297,084 and 3,330,343. Preferably, the electrolytes are inorganic acids, inorganic bases, and inorganic salts. Examples of electrolytes include sodium sulfate, sodium chloride, sodium hydroxide, hydrochloric acid, sulfuric acid, and sodium nitrate.

Preferably, the micellar dispersions consist essentially of five components, i.e. hydrocarbon, water, surfactant, electrolyte and semi-polar organic compound.

The percent formation pore volume of displacing fluid useful with the process depends on the crude oil, formation, and type of displacing fluid. Where the displacing fluid is a micellar dispersion, 1% to more than about 20% formation pore volume is useful to displace crude oil.

The front portion of the drive fluid tends to effect "leaching" or "sorption" of the semi-polar organic compound and/or electrolyte from the back portion of the displacing fluid when in the subterranean formation. By incorporating electrolyte and/or semi-polar compound within the front portion of the drive fluid, this adverse phenomenon can be corrected and as a result, more efficient sweeping of the formation is realized. This is especially true where high water saturations exist in the formation.

The ultimate purpose of the drive fluid is to effectively move the displacing fluid through the formation to displace crude oil. Also, it can act as a mobility buffer to protect the displacing fluid from invasion by a drive water. Preferably, the drive fluid should be compatible with the back portion of the displacing fluid and act as a mobility buffer to protect the displacing fluid.

Examples of drive fluids include non-polar materials (e.g. LPG), and polar materials such as water. The drive fluids of this invention do not include water-external emulsion drive fluids. Preferably, the front portion of the drive fluid has a mobility about equal to or less than the mobility of the back portion of the displacing fluid.

The drive fluid can be divided into a front portion, which is a minor mobility buffer portion, and a major back portion. The drive can be water, LPG or a like material. In this case, the front portion (i.e. the mobility buffer) contains the electrolyte and/or the semi-polar organic compound. Also, a portion of the mobility buffer can have graded mobilities from a low of about that of the displacing fluid to a high of about that of pure drive fluid, e.g. water or LPG drive.

The desired mobility is imparted to the drive fluid by solution of mobility control agents in the fluid. Such agents are also known as "thickening agents" and viscosity imparting agents. Agents such as organic polymers, e.g. polyisobutylene, are useful with non-polar materials. Agents such as polysaccharides, carboxy methyl cellulose, glycerine, high molecular weight alcohols, and especially high molecular weight partially hydrolyzed polyacrylamides (e.g. the Pusher series marketed by Dow Chemical Co.) are useful with polar materials, e.g. water.

The semi-polar organic compound and the electrolyte useful in the drive fluid are identical to those useful in the displacing fluid. The amount of semi-polar compound and/or electrolyte incorporated in the drive fluid will depend upon the particular characteristics of the micellar dispersion, the formation and the formation fluids. Amounts within the range of from about 0.05 to about 10% and more preferably from about 0.25% to about 5.0% of the semi-polar compound is effective with this invention. The electrolyte can vary from about 0.001% to and above about 4 weight percent but preferably is from about 0.02% up to about 1.0%. Preferably, the amounts of electrolyte and/or semi-polar compound within the front portion of the drive fluid are at equilibrium with electrolyte and/or semi-polar compound within the back portion of the displacing fluid (e.g. micellar dispersions). The concentration of additives can be reduced incrementally from a high at the juncture with the displacing fluid to a lesser amount at the rear of the additive containing drive fluid.

The size of the mobility control portion of the drive fluid can vary from about 1% to about 100% formation pore volume and preferably from about 5% to about 75%. However, this again is dependent upon the characteristic of the displacing fluid, formation fluids, etc. and where a small volume of displacing fluid is used, it may be necessary to use a larger percent formation pore volume of mobility buffer.

The following examples are presented to illustrate working embodiments of the invention. Such examples are not intended to limit the invention. Rather, it is intended that all equivalents obvious to those skilled in the art be incorporated within the scope of this invention. Percents are based on volume unless otherwise specified.

EXAMPLE 1

Clean Berea sandstone cores 47.5 inches long by 2 inches in diameter having characteristics indicated in Table II are subjected to a vacuum, saturated with water obtained from the Henry lease in Illinois (hereinafter identified as Henry plant water and containing about 18,000 p.p.m. of dissolved salts), flooded to irreducible water saturation with crude oil obtained from the Henry lease in Illinois (a sweet black Illinois crude having a viscosity of about 7 cp. at 72° F.), hereinafter identified as Henry crude oil and then flooded with Henry plant water to residual oil saturation. Thereafter, micellar dispersions having compositions outlined in Table I are injected into the cores (volume percents are indicated in Table II):

TABLE I.—MICELLAR DISPERSION COMPOSITION

| Component | Solution "A" (percent) | Solution "B" (percent) |
|---|---|---|
| Crude column overhead (a heavy naphtha) | 59.16 | 59.38 |
| Ammonium petroleum sulfonate (about 81 active) | 7.76 | 7.79 |
| Isopropanol | 1.73 | 1.35 |
| p-Nonyl phenol | 0.15 | 0.12 |
| Water | 31.20 | 31.36 |
| Sodium hydroxide (wt. percent) | 0.473 | 0.941 |

Thereafter, there is injected 1.2 pore volumes of a thickened water (mobility buffer) containing water contained from the Palestine water reservoir in Palestine, Ill. (contains about 450 p.p.m. of dissolved salts, hereinafter identified as Palestine water), 800 p.p.m. of No. 530 Pusher (a high molecular weight partially hydrolyzed polyacrylamide sold by Dow Chemical Company), 50 p.p.m. of ammonium thiocyanate, 800 p.p.m. isopropyl alcohol (this small amount added *only* to facilitate the solubilization of No. 530 Pusher), plus the additional alcohol (semi-polar organic compound) indicated in Table II. Table II contains data indicating increased crude oil recovery by incorporating the semi-polar organic compound and the electrolyte within the leading edge of the thickened water.

TABLE II

| Sample | Core characteristics | | | Micellar dispersion | | Thickened water | | Crude oil recovery | |
|---|---|---|---|---|---|---|---|---|---|
| | Permeability (md.) | Effective porosity (percent) | Residual oil saturation (percent) | Type (Table I) | Slug size, percent PV of formation | Percent vol. alcohol | Type of alcohol | Recovery of crude in core | Percent improvement |
| a | 252 | 20.1 | 35.8 | A | 3 | | | 46.4 | 0 |
| b | 222 | 19.3 | 36.2 | A | 3 | 4 | Isopropanol | 62.6 | 35 |
| c | 383 | 20.8 | 33.9 | A | 3 | 6 | do | 71.6 | 54 |
| d | 229 | 19.7 | 36.4 | B | 5 | | | 78.9 | 0 |
| e | 213 | 19.7 | 34.0 | B | 3 | 4 | Isopropanol | 84.4 | 7 |
| f | 304 | 20.6 | 34.9 | B | 3 | 6 | do | 86.6 | 10 |
| g | 300 | 19.5 | 33.8 | B | 3 | 1 | i-Amyl alcohol | 91.5 | 16 |
| h | 228 | 19.3 | 35.0 | B | 3 | 1 | n-Amyl alcohol | 87.7 | 11 |
| i | 226 | 19.4 | 33.1 | B | 3 | 3 | i-Butanol | 92.2 | 17 |
| j | 336 | 20.2 | 35.2 | B | 3 | 3 | n-Butanol | 93.9 | 19 |

Samples b and c indicate increased oil recovery over Sample a (contaínes no semi-polar compound in the thickened water). Samples e–j show improved oil recovery over Sample d even though Samples e–j are based on 3% PV (formation pore volume) while Sample d is based in 5% PV.

What is claimed is:

1. A process for recovering crude oil from subterranean formations wherein displacing fluids are injected into the formation through at least one injection means to displace crude oil toward at least one production means, the process comprising injecting into the formation:
   (1) a displacing fluid selected from the group consisting of oil-external emulsions, water-external emulsions, and oil-external micellar dispersions comprised of component(s) selected from the group consisting of semi-polar organic compound, electrolyte, or a combination of the semi-polar compound and electrolyte, and immediately thereafter injecting
   (2) a drive fluid having a front portion comprised of component(s) selected from the group consisting of semi-polar organic compound, electrolyte or a combination of the semi-polar organic compound and the electrolyte—and moving the displacing fluid and drive fluid toward at least one production means and recovering crude oil therefrom.

2. The process of claim 1 wherein the displacing fluid is a micellar dispersion.

3. The process of claim 2 wherein 1% to about 20% formation pore volume of the micellar dispersion is injected into the formation.

4. The process of claim 1 wherein the front portion of the drive fluid is a mobility buffer having a mobility about equal to or less than the mobility of the displacing fluid.

5. The process of claim 1 wherein the drive material is substantially aqueous.

6. The process of claim 1 wherein the component(s) within the back portion of the displacing fluid are at equilibrium within the component(s) with the front portion of the drive fluid.

7. A process for recovering crude oil from subterranean formations wherein displacing fluids are injected into the formation through at least one injection means to displace the crude oil toward at least one production means, the process comprising the successive injections into the formation:
  (1) a micellar dispersion comprised of component(s) selected from the group consisting of electrolyte, semi-polar organic compound, or a combination of the electrolyte and semi-polar organic compound,
  (2) a mobility buffer characterized in that the front portion of the buffer is comprised of component(s) selected from the group consisting of electrolyte, semi-polar organic compound or a combination of the electrolyte and the semi-polar organic compound, and
  (3) a water drive in amounts sufficient to displace the micellar dispersion and the mobility buffer toward at least on production means and recovering crude oil therefrom.

8. The process of claim 7 wherein the component(s) within the back portion of the micellar dispersion and the component(s) within the front portion of the mobility buffer are substantially at equilibrium within the formation.

9. The process of claim 7 wherein the front portion of the mobility buffer has a mobility about equal to or less than the mobility of the back portion of the micellar dispersion.

10. The process of claim 9 wherein a portion of the mobility buffer has graded mobilities from a low of the micellar dispersion to a high of the water drive.

References Cited
UNITED STATES PATENTS

| | | | |
|---|---|---|---|
| 3,123,135 | 3/1964 | Bernard et al. | 166—9 |
| 3,175,610 | 3/1965 | Osoba | 166—9 |
| 3,203,480 | 8/1965 | Froning | 166—9 X |
| 3,261,399 | 7/1966 | Coppel | 166—9 |
| 3,266,570 | 8/1966 | Cogarty | 166—9 |
| 3,270,811 | 9/1966 | Meyer et al. | 166—9 |
| 3,297,084 | 1/1967 | Gogarty et al. | 166—9 |
| 3,330,344 | 7/1967 | Reisberg | 166—9 |
| 3,346,047 | 10/1967 | Townsend et al. | 166—9 |
| 3,348,611 | 10/1967 | Reisberg | 166—9 |
| 3,406,754 | 10/1968 | Gogarty | 166—9 |

STEPHEN J. NOVOSAD, Primary Examiner

U.S. Cl. X.R.

166—274

PO-1050
(5/69)

UNITED STATES PATENT OFFICE
CERTIFICATE OF CORRECTION

Patent No. 3,507,331  Dated April 21, 1970

Inventor(s) Stanley C. Jones

It is certified that error appears in the above-identified patent and that said Letters Patent are hereby corrected as shown below:

| | |
|---|---|
| Column 1, line 31: should read | "subterranean" --formation--. |
| Column 1, line 31: | Delete "ecected" and insert --effected--. |
| Column 1, line 65: | Delete "3,3301,325" and insert --3,301,325--. |
| Table I, under "Component" | After "81" insert --%--. |
| Table I, under "Solution B" | Delete "1.35" and insert --1.36--. |
| "      "      "      " | Delete "0.12" and insert --0.15--. |
| "      "      "      " | Delete "31.36" and insert --31.32--. |
| Column 4, line 14: | Delete "contained" and insert --obtained--. |
| Table II, under "Effective Porosity" | Delete "20,8" and insert --20.8--. |
| In Footnote under Table II: | Delete "containes" and insert --contains--. |

SIGNED AND
SEALED
SEP 15 1970

(SEAL)
Attest:

Edward M. Fletcher, Jr.
Attesting Officer

WILLIAM E. SCHUYLER, JR.
Commissioner of Patents